(12) United States Patent
Asahi et al.

(10) Patent No.: US 6,825,880 B2
(45) Date of Patent: Nov. 30, 2004

(54) ARRANGEMENT FOR GUIDING STEERING TO ASSIST PARALLEL PARKING

(75) Inventors: Goro Asahi, Aichi-ken (JP); Hisashi Kuriya, Aichi-ken (JP); Kazunori Shimazaki, Aichi-ken (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 783 days.

(21) Appl. No.: 09/750,815

(22) Filed: Dec. 28, 2000

(65) Prior Publication Data

US 2001/0030688 A1 Oct. 18, 2001

(30) Foreign Application Priority Data

Dec. 28, 1999 (JP) .......................................... 11-373207

(51) Int. Cl.⁷ .......................... H04N 5/222; G08G 1/14
(52) U.S. Cl. .............. 348/333.02; 348/148; 340/932.2; 701/41
(58) Field of Search ........................ 348/61, 113, 118, 348/119, 143, 148, 207.99, 333.01, 333.02; 340/435, 436, 437, 438, 901, 903, 932.2; 180/199, 204, 271; 700/61, 255; 701/23–26, 36, 41

(56) References Cited

U.S. PATENT DOCUMENTS

| 4,931,930 | A |   | 6/1990  | Shyu et al. ............. 364/424.01 |
| 5,742,141 | A | * | 4/1998  | Czekaj ........................ 318/587 |
| 6,170,591 | B1| * | 1/2001  | Sakai et al. .................. 180/204 |
| 6,344,805 | B1| * | 2/2002  | Yasui et al. ............... 340/932.2 |
| 6,366,221 | B1| * | 4/2002  | Iisaka et al. ............. 340/932.2 |
| 6,424,895 | B1| * | 7/2002  | Shimizu et al. ................ 701/41 |
| 6,487,481 | B2| * | 11/2002 | Tanaka et al. ................. 701/41 |
| 6,587,760 | B2| * | 7/2003  | Okamoto ........................ 701/1 |
| 6,621,421 | B2| * | 9/2003  | Kuriya et al. ............. 340/932.2 |
| 6,683,539 | B2| * | 1/2004  | Trajkovic et al. ......... 340/932.2 |
| 2003/0165255 | A1 | * | 9/2003 | Yanagawa et al. .......... 382/104 |

FOREIGN PATENT DOCUMENTS

| EP | 1 022 903 A2 | 7/2000 | ............ H04N/7/18 |
| JP | 2-126417     | 8/1990 | ............. B60R/1/00 |
| JP | 10-244891    | 9/1998 | ........... B60R/21/00 |

* cited by examiner

*Primary Examiner*—Ngoc-Yen Vu
(74) *Attorney, Agent, or Firm*—Morgan & Finnegan, LLP

(57) ABSTRACT

When a vehicle is located in a predetermined position M, a steering amount guide mark is moved on a steering start guide line as a steering angle is increased by turning a steering wheel. The steering amount guide mark has a size according to the steering angle of the steering wheel at that time. When the steering angle becomes suitable, the steering amount guide mark has the same size as a target parking space T. Thus, a driver can more instinctively recognize the suitable steering angle of the steering wheel. Further, the driver can easily judge by observing the locus line of a left-hand forward corner portion of the vehicle whether or not the left-hand forward corner portion of the self-vehicle that particularly needed to be known in column parking on the left-hand side of a road interferes with a certain obstacle during a path until the target parking space T.

7 Claims, 8 Drawing Sheets

ARRANGEMENT FOR GUIDING STEERING TO ASSIST PARALLEL PARKING

BACKGROUND OF THE INVENTION

1. Field of the Invention

This invention relates to a steering assist device at a parking time in retreat, and particularly relates to a device for superposing and displaying for supporting a steering wheel operation at the parking time on a monitor screen on which the picture of a backward portion of a vehicle is displayed.

2. Description of the Related Art

A device for displaying a backward view field of the vehicle in a monitor is conventionally proposed when no driver can see a place as a target at a dead angle of the vehicle at a retreating time of the vehicle. For example, Japanese Patent Publication No. 2-36417 discloses a backward monitor device of the vehicle comprising a television camera for photographing a backward portion of the vehicle, a monitor television for displaying a picture image picked up by this television camera, a sensor for outputting an information signal relative to a tire steering angle, and a circuit for generating a marker signal according to the information signal from this sensor and superposing and displaying a marker on the television screen. In this device, steering angle data of the tire and marker position data along a backward direction of the vehicle corresponding to this steering angle are stored in a ROM. A predicting backward locus of the vehicle according to the steering angle at that time is superposed on the picture image picked up by the television camera and is displayed on the television screen as a series of markers.

In accordance with such a device, the view field of a backward road situation, etc., and the predicting backward locus of the vehicle according to the steering angle are displayed on the screen of the monitor television at a backward moving time of the vehicle. Therefore, the driver can retreat the vehicle by operating the steering wheel while the driver sees the television screen without turning the driver's head backward.

For example, in a column parking case, the vehicle is retreated in parallel with the road, and the steering wheel is turned in a suitable position so that the vehicle is advanced into a parking space. Further, it is necessary to turn back the steering wheel in a reverse direction, and guide the vehicle to a parking position as a target. However, in the conventional backward monitor device, it is difficult for the driver to judge a starting position of the turning of the steering wheel, a turning-back position of the steering wheel, and the degree of a steering amount by only seeing the backward view field and the predicting backward locus of the vehicle on the television screen. Accordingly, a problem exists in that no monitor device can sufficiently support the column parking.

SUMMARY OF THE INVENTION

To solve such a problem, an object of the present invention is to provide a steering assist device at a parking time in which a driver can easily grasp steering timing and a steering amount at a backward parking time.

Further, another object of the present invention is to provide a steering assist device which, at a parking time, can confirm whether a self-vehicle interferes with an obstacle or not.

To achieve the above objects, the present invention resides in a steering assist device comprising: a camera for photographing a backward portion of a vehicle; a monitor arranged in a driver's seat of the vehicle; a steering angle sensor for detecting the steering angle of a steering wheel; and display control means for displaying a picture image provided by said camera in said monitor at a retreating time of the vehicle, and superposing and displaying a guide display for supporting driving of the vehicle at a parking time on a screen of said monitor, the steering assist device being characterized in that said guide display including: a steering start guide line fixedly displayed in a predetermined position on the screen of said monitor for guiding a steering start spot for parking; an eye mark fixedly displayed in a predetermined position on the screen of said monitor for guiding a turning-back spot of the steering wheel; and a steering amount guide mark moved and displayed along said steering start guide line on the screen of said monitor in accordance with the steering angle of the steering wheel detected by said steering angle sensor, said steering amount guide mark including a predicting parking area when the vehicle retreats and parking is completed with maintaining the steering angle of the steering wheel detected by said steering angle sensor, said steering amount guide mark being changed in size on the basis of far and near sense according to the steering angle.

DESCRIPTION OF THE PREFERRED EMBODIMENTS

Embodiments of this invention will next be explained on the basis of the accompanying drawings.

[Embodiment 1]

Figure 1:
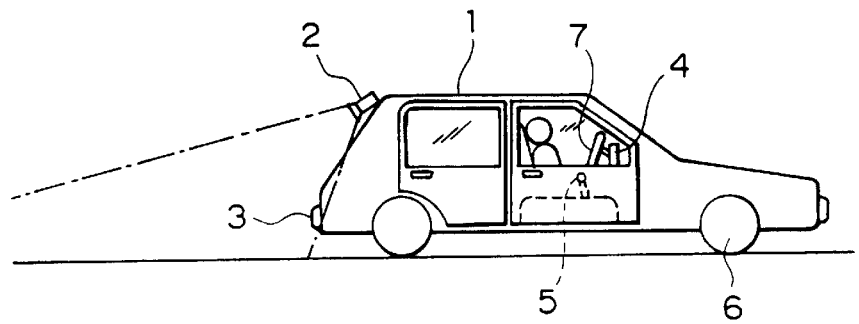
FIG. 1 is a side view showing a vehicle mounting a steering assist device of the present invention thereto.

As shown in FIG. 1, a camera 2 for photographing a backward view field of a vehicle 1 is attached to a rear portion of the vehicle 1. A rear bumper 3 of the vehicle 1 is arranged in a proximate side end portion of a view field range of the camera 2. A monitor 4 comprising a liquid crystal display of a color type is arranged in a driver's seat of the vehicle 1, and is normally used as the display unit of a navigation device. When a shift lever 5 arranged in the driver's seat is operated and moved to a backward position, a picture image picked up by the camera 2 is displayed. The front wheels 6 is steered by the operation of a steering wheel 7. A steering angle α of the front wheels 6 is represented as a value Kθ obtained by multiplying a predetermined coefficient K by a steering angle θ of the steering wheel 7. Here, the coefficient K is not limited to a constant, but is desirably set in conformity with the actual state of the vehicle.

Figure 2:
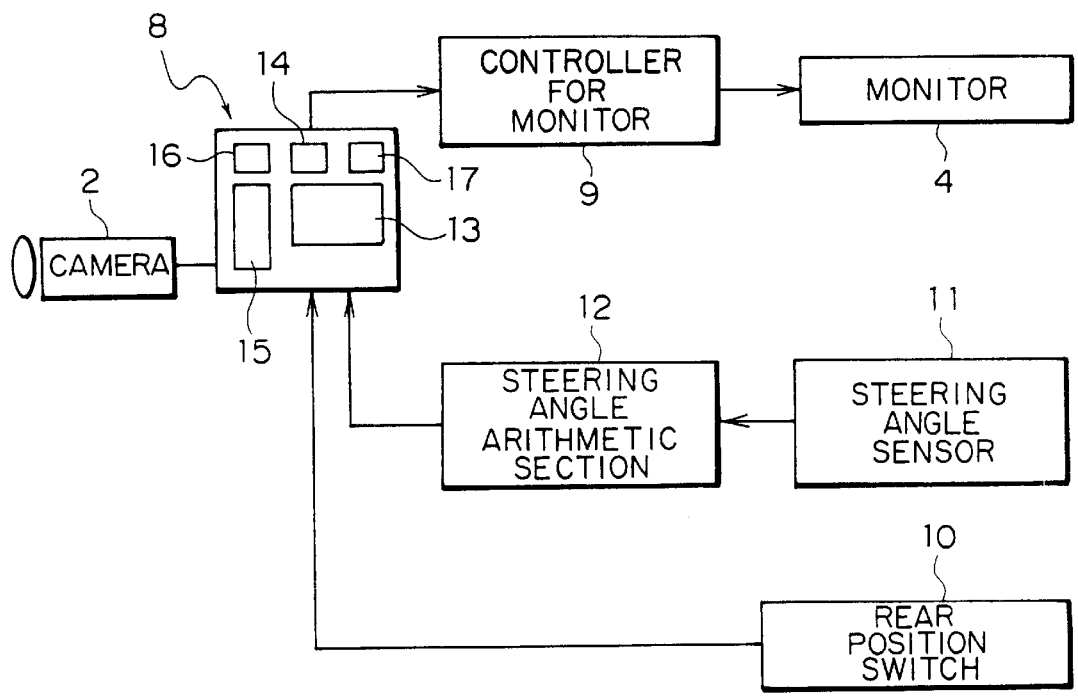
FIG. 2 is a block diagram showing the construction of the steering assist device of the present invention.

FIG. 2 shows the construction of a steering assist device at a column parking time in the present embodiment. An image processor 8 is connected to the camera 2, and the monitor 4 is connected to this image processor 8 through a controller 9 for a monitor. A rear position switch 10 is arranged in the vehicle 1, and detects whether the shift lever 5 is switched to a backward moving position or not. This position switch 10 is connected to the image processor 8. A steering angle sensor 11 for detecting the steering angle θ of the steering wheel 7 is attached to a steering shaft of the steering wheel 7. This steering angle sensor 11 is connected to the image processor 8 through a steering angle arithmetic section 12.

The controller 9 for a monitor normally displays information based on a display signal from the unillustrated navigation device in the monitor 4. However, when a display signal from the image processor 8 is inputted to the controller 9, the controller 9 performs a display operation based on this display signal from the image processor 8 in the monitor 4. The steering angle arithmetic section 12 calculates the steering angle α of the front wheels 6 from the steering angle θ of the steering wheel 7 detected by the steering angle sensor 11, and outputs the steering angle α to the image processor 8.

The image processor 8 has a CPU 13, a ROM 14 storing a control program thereto, a processor 15 for image processing which processes picture image data from the camera 2, an image memory 16 for storing the picture image data processed by the processor 15 for image processing, and a RAM 17 for working.

A display control means is formed by such an image processor 8 and the controller 9 for a monitor.

Display data of a fixed guide display fixedly displayed in a predetermined position of a screen 19 of the monitor 4 irrespective of steering of the steering wheel 7 are stored to the ROM 14. As shown by a solid line in FIG. 3A, the fixed guide display has a pair of vehicle width guide lines 20 and 21 showing predicting positions of both side portions of the vehicle 1 at a straight retreating time of the vehicle 1, and also has circular eye marks 22 and 23 which are respectively arranged in upper end portions of the vehicle width guide lines 20 and 21, i.e., in rear end portions of the vehicle width guide lines 20 and 21 on the screen 19 displaying a backward picture image. The fixed guide display further has a pair of steering start guide lines 24 and 25 arranged with left-hand and right-hand symmetry in upper portions within the screen 19. The steering start guide lines 24 and 25 show start timing of steering for column parking of the vehicle 1 straightly retreated in parallel with a road, and are respectively drawn as line segments of predetermined lengths.

The CPU 13 is operated on the basis of the control program stored to the ROM 14. When the CPU 13 detects that the shift lever 5 is switched to a retreating position by the rear position switch 10, the CPU 13 calculates a predicting locus of the vehicle 1 at a retreating time at the steering angle α at that time from an output signal of the steering angle arithmetic section 12. The CPU 13 then makes display data in a predetermined period on the basis of this predicting locus. In the display data, a moving guide display showing the vehicle width is superposed on a picture image of the camera 2 in a position corresponding to the steering angle α and is displayed.

Figure 3A:
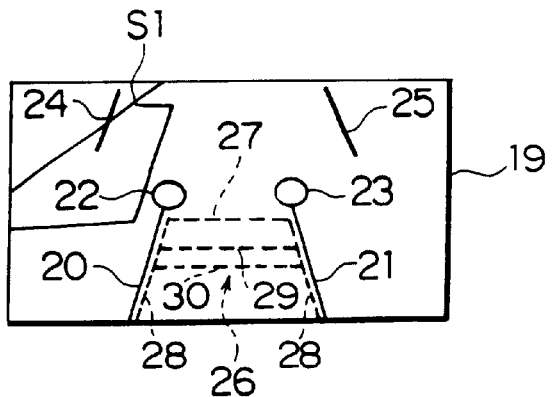
FIGS. 3A to 3E is a view stepwise and briefly showing a monitor screen at a column parking time Embodiment 1, respectively.

As shown by a broken line in FIG. 3A, a moving guide display 26 has a line segment 27, a pair of vehicle width lines 28, and a pair of line segments 29, 30. The line segment 27 corresponds to the predicting locus of the vehicle 1 at the retreating time at the steering angle α at that time, and has a length of the vehicle width approximately in the position parted from a rear end of the vehicle on the screen 19 of the monitor 4 only a wheel base length. The pair of vehicle width lines 28 are extended to the rear end of the vehicle while a distance of the vehicle width is held from both ends of this line segment 27. The pair of line segments 29, 30 connect intermediate portions of the vehicle width line 28 and are extended to a vehicle width direction. For example, as shown by a broken line in FIG. 3C, the moving guide display 26 is curved in leftward and rightward directions in accordance with steering of the steering wheel 7.

Figure 4:
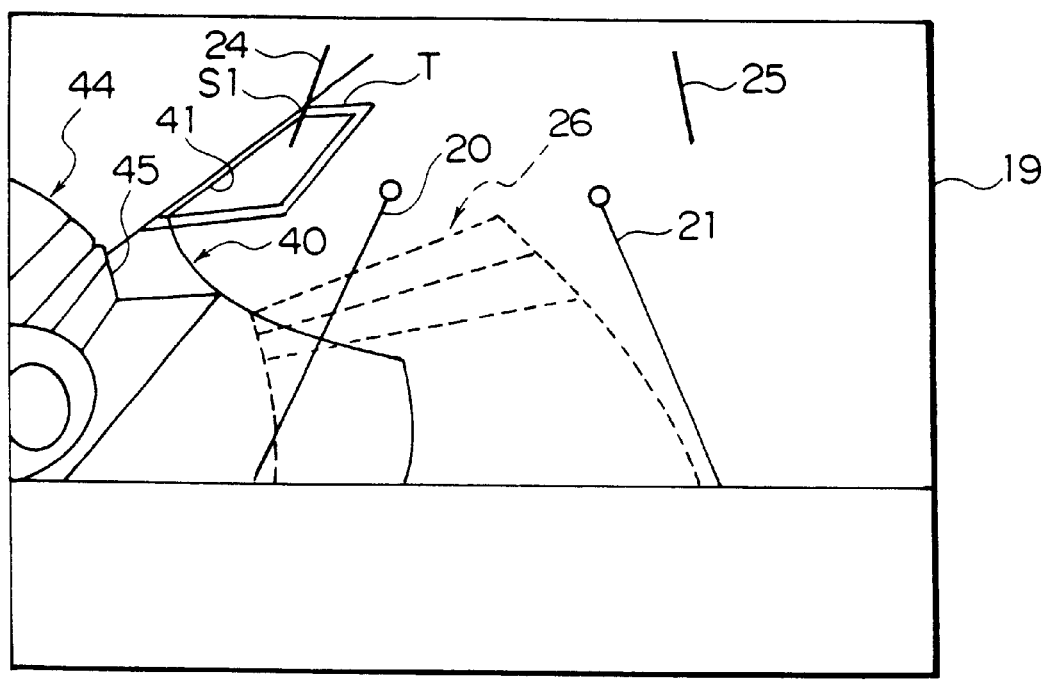
FIG. 4 is a view briefly showing the monitor screen displaying a steering amount guide mark and a locus line in Embodiment 1.

Further, the CPU 13 makes display data as shown in FIG. 4 in a predetermined period. In these display data, a steering amount guide mark 41 and a locus line 40 extending from this steering amount guide mark 41 are superposed on the picture image of the camera 2, and are displayed. The steering amount guide mark 41 is a display moved along the steering start guide lines 24 and 25 on the screen 19 of the monitor 4 in accordance with the steering angle α at that time on the basis of the output signal of the steering angle arithmetic section 12. The steering amount guide mark 41 shows a predicting parking area when the vehicle begins to be retreated and is completely parked in accordance with a retreating path V (see FIG. 5) of an S-character shape described later with maintaining the steering angle at that time. In contrast to this, the locus line 40 in this embodiment is a line which connects a left-hand forward corner portion of the self-vehicle as a particular problem, and a portion hitting against the left-hand forward corner portion of the self-vehicle in a moving case of the vehicle to the predicting parking area so as to explain a column parking case on the left-hand side of a road as an example. The locus line 40 shows a locus of the left-hand forward corner portion of the self-vehicle on the screen when the vehicle begins to be retreated and is completely parked along the retreating path V as described later with maintaining the steering angle at that time. In the column parking case on the right-hand side of the road, a line connecting a right-hand forward corner portion of the self-vehicle as a particular problem, and a portion hitting against the right-hand forward corner portion of the self-vehicle in a moving case of the vehicle to the predicting parking area, is used.

Figure 5:
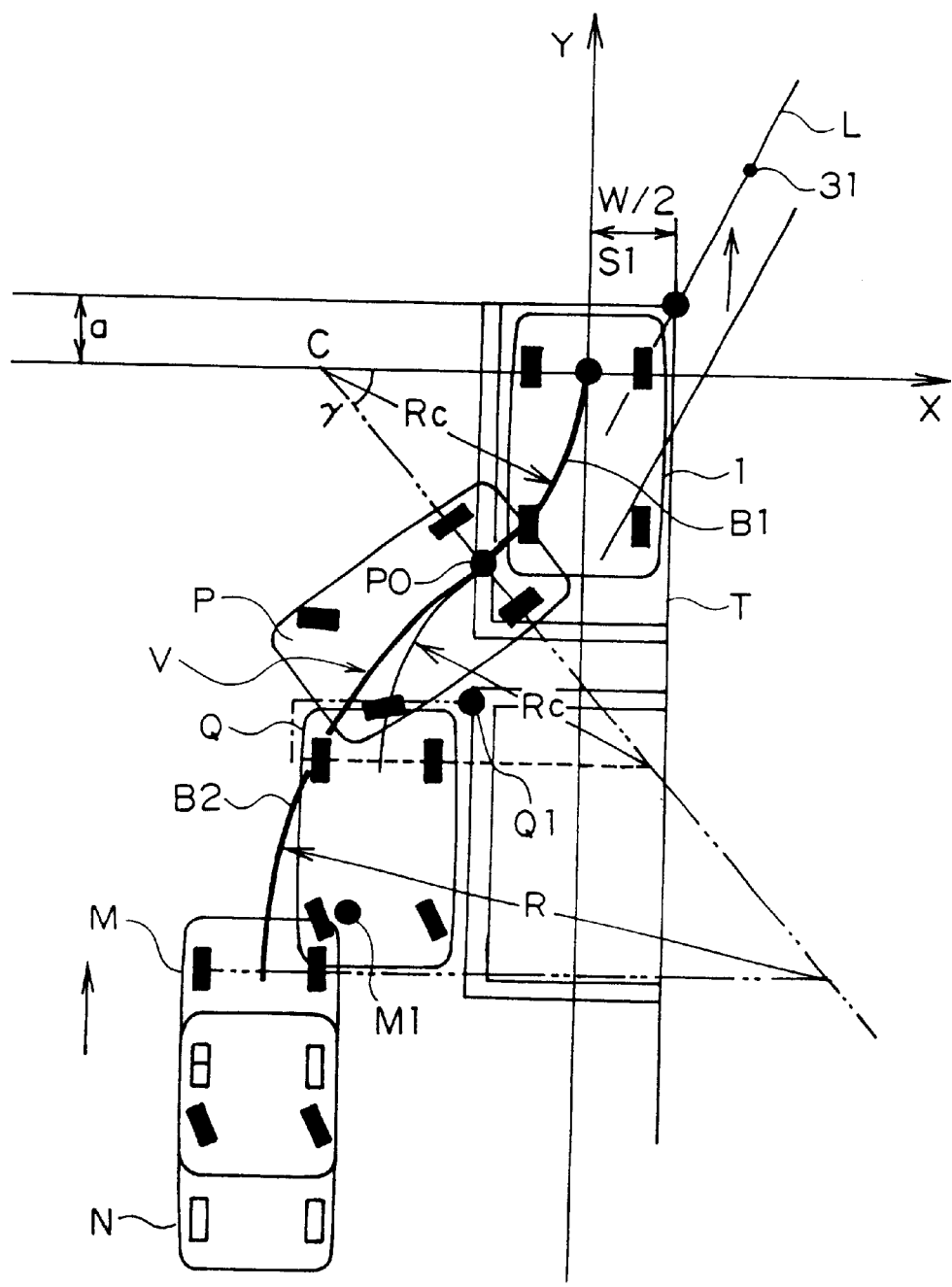
FIG. 5 is a view stepwise and briefly showing a vehicle position at the column parking time in Embodiment 1.

Here, how to derive the steering start guide lines 24 and 25, and the steering amount guide mark 41 will be explained. As shown in FIG. 5, an origin is set to the center of a rear axle of the vehicle 1 in a state in which the vehicle 1 is properly parked in a parking space T. A Y-axis is set to a retreating direction of the vehicle 1 in parallel with the road, and an X-axis is set to be perpendicular to the Y-axis. Further, a deep corner of the parking space T is set to a target point S1, and its coordinate is set to S1 (W/2, a). Here, W and a respectively designate a vehicle width and a rear overhang. The vehicle 1 in a vehicle position Q is retreated while the steering angle of the steering wheel 7 is maximized and the steering wheel 7 is turned with a radius Rc. When the vehicle 1 is located in a vehicle position P as a turning-back position, the steering wheel 7 is turned back in a reverse direction so as to maximize the steering angle. In this state, the vehicle 1 is retreated with the radius Rc, and is properly parked in the parking space T.

First, when the vehicle is retreated from the vehicle position P to the parking space T with the turning radius Rc about the rear axle center at the maximum steering angle, an angle $\gamma$ of the vehicle position P seen from a turning center C is provided as follows.

$$\gamma = \cos^{-1}[(Rc-W/2)/\{(Rc+W/2)^2+a^2\}^{1/2}] - \tan^{-1}\{a/(Rc+W/2)\}$$

Coordinates (P0x, P0y) of the rear axle center P0 in the vehicle position P are represented as follows by using the above angle $\gamma$.

$$P0x = -Rc(1-\cos\gamma)$$

$$P0y = -Rc\cdot\sin\gamma$$

Further, if the parking space T is parallel-displaced to the vehicle position Q from the coordinates of this rear axle center P0, coordinates (Q1x, Q1y) of a point Q1 as a deep corner of the parking space corresponding to a target point S1 are calculated as follows.

$$Q1x = -2Rc(1-\cos\gamma)+W/2$$

$$Q1y = -2Rc\cdot\sin\gamma + a$$

Accordingly, a straight line L connecting the target point S1 and the point Q1 is represented as follows.

$$Y = \{\sin\gamma/(1-\cos\gamma)\}\cdot X - \{\sin\gamma/(1-\cos\gamma)\}\cdot(W/2) + a$$

When the vehicle 1 is located in the vehicle position Q, the target point S1 on the screen 19 of the monitor 4 is set to a start point, and a line segment extended backward along the straight line L becomes a steering start guide line. This steering start guide line is drawn with left-hand and right-hand symmetry with respect to the Y-axis, and these drawn lines are set to the steering start guide lines 24 and 25.

If the target point S1 of the parking space T displayed on the screen 19 of the monitor 4 is overlapped with the steering start guide lines 24 or 25 as the vehicle 1 is moved, this overlapping place can be judged as a place in which the vehicle can be parked in a column by the steering assist device of this invention.

A drawing method of the steering amount guide mark 41 will next be explained. An arbitrary vehicle position M parallel to the Y-axis and reaching the vehicle position P by retreating the vehicle while turning the vehicle with a radius R is considered. If the parking space T is parallel-displaced to the vehicle position M, coordinates (M1x, M1y) of a point M1 at a deep corner of the parking space corresponding to the target point S1 are shown as follows.

$$M1x = -(R+Rc)\cdot(1-\cos\gamma)+W/2$$

$$M1y = -(R+Rc)\sin\gamma + a$$

The turning radius R is calculated as follows by using this Y-coordinate M1y.

$$R = (a-M1y)/\sin\gamma - Rc$$

Therefore, a reference point 31 moved along the steering start guide lines 24 and 25 in accordance with the steering angle $\alpha$ of the steering wheel 7 is first supposed. A position of the reference point 31 is set such that the turning radius R of the above formula is obtained just when the steering wheel 7 is steered so as to overlap this reference point 31 with the target point S1 of the parking space T displayed on the screen 19 of the monitor 4. Further, a predicting parking area of the vehicle having the reference point 31 at a vertex of an outer shape is displayed on the monitor screen, and is set to the steering amount guide mark 41. When the steering angle is changed by turning the steering wheel 7, the reference point 31 is moved along the steering start guide lines 24 and 25. Namely, the steering amount guide mark 41 having the reference point 31 at the vertex is also moved along the steering start guide lines 24 and 25. An area shown by the steering amount guide mark 41 shows the predicting parking area when the vehicle begins to be retreated and is completely parked with maintaining the steering angle at that time as mentioned above. Therefore, when the steering angle of the steering wheel 7 is increased, i.e., when the turning radius is decreased, the predicting parking area is shown in a position closer to the self-vehicle on the monitor screen 19. In contrast to this, when the steering angle of the steering wheel 7 is decreased, i.e., when the turning radius is increased, the predicting parking area is shown in a position farther from the self-vehicle on the monitor screen 19. Accordingly, the steering amount guide mark 41 is largely displayed when the steering angle of the steering wheel 7 is large and the parking area in a position closer to the self-vehicle is shown. In contrast to this, the steering amount guide mark 41 is displayed as a small mark when the steering angle of the steering wheel 7 is small and the parking area in a position farther from the self-vehicle is shown. Namely, the size of the steering amount guide mark 41 is changed such that a position of the predicting parking area can be represented in accordance with far and near sense on the monitor screen 19.

Figure 6:
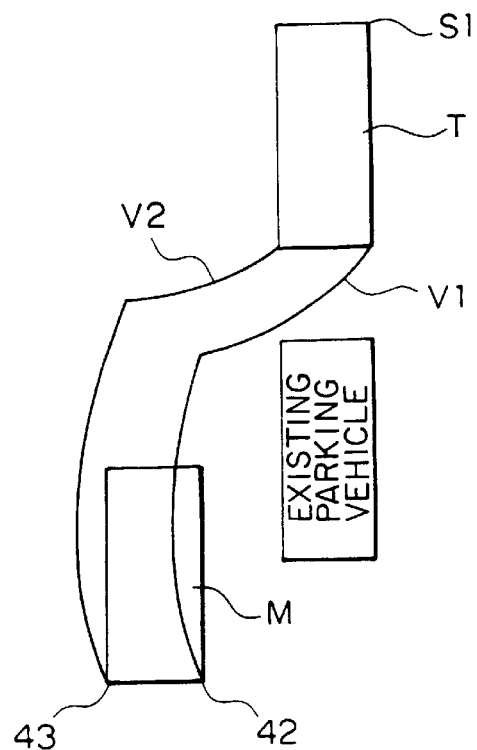
FIG. 6 is a view showing a retreating path as a premise of the locus line of a corner portion of a forward portion of the vehicle.

As shown in FIG. 6, retreating paths V1 and V2 of a left-hand forward corner portion 42 and a right-hand forward corner portion 43 of the vehicle are calculated by using a technique for deriving the retreating path V of the rear axle center to the target parking space T when the vehicle is moved from the position M to the target parking space T through the turning-back position P. In this embodiment, the column parking on the left-hand side of a road is set to an example. Therefore, the locus line 40 of the left-hand forward corner portion of the vehicle, and the steering amount guide mark 41 are derived as obstacle interference information by performing coordinate transformation such that the retreating path V1 of the left-hand forward corner portion 42 corresponds to a backward picture image of the vehicle in the monitor 19.

Next, an operation of the steering assist device at the column parking time will be explained. First, when a driver operates and moves the shift lever 5 to a retreating position in a vehicle position N parallel with a road as shown in FIG. 5, the image processor 8 superposes the vehicle width guide lines 20, 21, the eye marks 22, 23 and the steering start guide lines 24, 25 on a picture image of the camera 2 on the screen 19 of the monitor 4 on the basis of a detecting signal from the rear position switch 10 as shown in FIG. 3A, and displays the superposed lines, etc.

At this time, no target point S1 of the parking space T is yet overlapped with the steering start guide line 24 for left-hand backward parking on the screen 19.

Figure 3B:
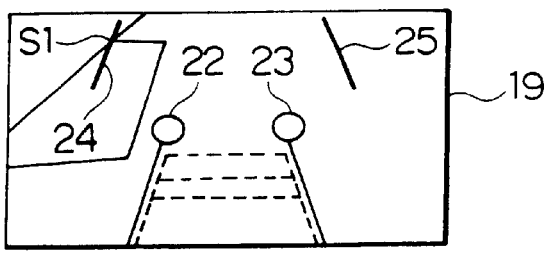
Figure 3C:
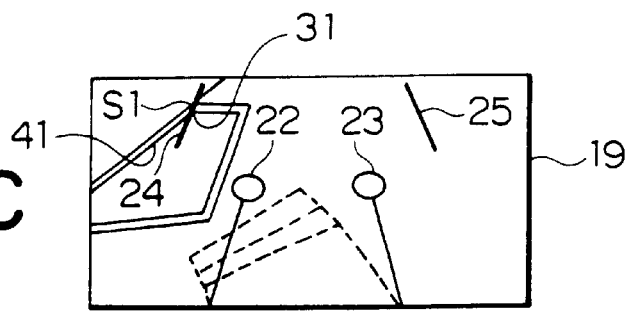

When the vehicle 1 is straightly retreated in parallel with the road, the target point S1 gradually approaches the steering start guide line 24 on the screen 19. As shown in FIG. 3B, when the target point S1 is overlapped with the steering start guide line 24, it is judged that the vehicle is in the vehicle position M for starting the column parking and the vehicle 1 is stopped.

Next, when the steering wheel 7 is turned leftward, the steering amount guide mark 41 is gradually moved from upward to downward on the screen 19 along the steering start guide line 24. At this time, when the steering angle of the steering wheel 7 is small, a parking area expected to be reached by the vehicle is sufficiently far from the self-vehicle. Therefore, the steering amount guide mark 41 is displayed as a small mark in an upper portion on the steering start guide line 24. As the steering angle is increased by continuously turning the steering wheel 7, the parking area reached by the vehicle gradually approaches the self-vehicle. Therefore, while the steering amount guide mark 41 is moved downward along the steering start guide line 24, the size of the steering amount guide mark 41 is gradually increased. When the steering angle of the steering wheel 7 becomes a suitable angle, i.e., an angle providing the turning radius R in FIG. 5, the steering amount guide mark 41 has a position and a size such that the steering amount guide mark 41 is approximately overlapped with the target parking space T on the monitor screen 19. Thus, the driver can recognize that the steering amount of the steering wheel 7 is suitable. The driver then retreats the vehicle in a state in which the steering angle is maintained as it is. The overlapping state of the steering amount guide mark 41 with the target parking space T shows that the steering angle of the steering wheel 7 is suitable. Therefore, the driver can recognize that the vehicle is successfully parked in sense at the steering angle of the steering wheel 7 at that time. Accordingly, a guide display easily understood can be provided.

In parallel with this display, the image processor 8 also displays the locus line 40 connected to the steering amount guide mark 41 on the monitor screen 19 as shown in FIG. 4. Thus, the driver can easily judge whether or not the left-hand forward corner portion of the self-vehicle to be particularly known in the column parking onto the left-hand side of the road interferes with a certain obstacle in a path between the self-vehicle and the target parking space. Namely, in a state displayed on the monitor screen 19 of FIG. 4, no right-hand backward corner portion 45 of an existing vehicle 44 parked in front of the target parking space T is overlapped with the locus line 40 of the left-hand forward corner portion 42 of the self-vehicle. Therefore, the driver can know in advance that no vehicle interferes with the obstacle even when the driver retreats the vehicle as it is until the target parking space. Accordingly, it is possible to prevent that the driver notices that no vehicle can be parked after the driver retreats the vehicle to a certain extent, and the driver must again park the vehicle.

The locus line 40 and the steering amount guide mark 41 in the left-hand forward corner portion are set to be automatically erased from the monitor screen when a predetermined time has passed after the locus line 40 and the steering amount guide mark 41 are displayed on the monitor screen 19. Accordingly, the driver did not have the necessity for erasing the displays of the locus line 40 and the steering amount guide mark 41, these displays can be erased without performing any special operation. The locus line 40 and the steering amount guide mark 41 are not used when the column parking operation is advanced to a certain extent. However, in this embodiment, the locus line 40 and the steering amount guide mark 41 are continuously displayed at any time, and no problem exists in that the locus line 40 and the steering amount guide mark 41 cannot be seen well on the monitor screen.

The target parking space T and the steering amount guide mark 41 are considerably separated from each other on the monitor screen of FIG. 4 (similar to FIGS. 8 and 10 to 12 described later). However, this is because clearness of this figure is secured. The target parking space T and the steering amount guide mark 41 are almost in conformity with each other in the actual monitor screen display. When the target parking space T and the steering amount guide mark 41 are in conformity with each other in such a way, the driver easily discriminates the difference between the target parking space T and the steering amount guide mark 41 if the steering amount guide mark is colored to discriminate this guide mark from a backward picture image.

Figure 3D:
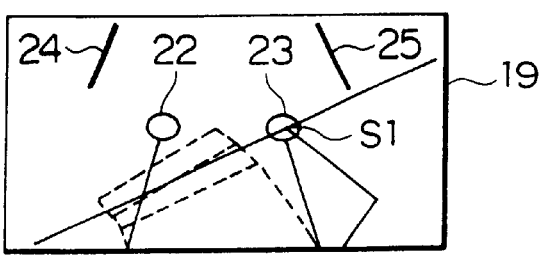

As mentioned above, when the steering amount guide mark 41 is overlapped with the target parking space T, the driver retreats the vehicle 1 while the driver holds the steering angle of the steering wheel 7. Thus, the vehicle 1 is turned with the radius R, and the target point S1 gradually approaches the eye mark 23 for the left-hand backward parking on the screen 19. As shown in FIG. 3D, when the target point S1 is overlapped with the eye mark 23, it is judged that the vehicle 1 reaches the vehicle position P, i.e., a steering wheel turning-back position, and the vehicle 1 is stopped.

Figure 3E:
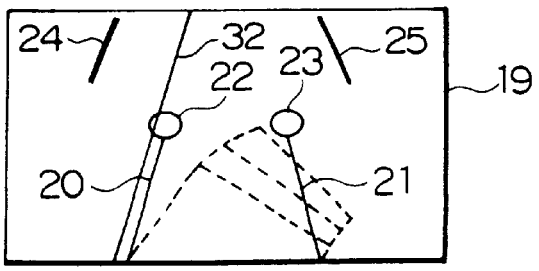

Next, the steering angle of the steering wheel 7 is maximized in a reverse direction in rest swing, and the vehicle 1 is retreated. Thus, the vehicle 1 enters the interior of the parking space T. As shown in FIG. 3E, when the vehicle width guide line 20 is set to be parallel to a road side line 32, the vehicle 1 is stopped and the column parking is completed.

In the column parking of the vehicle to a right-hand backward parking space, the vehicle 1 is similarly stopped by using the steering start guide line 25 and the eye mark 22 for the right-hand backward parking, and the steering amount guide mark for the right-hand backward parking, and the locus line of a right-hand forward corner portion 43 of the vehicle calculated on the basis of a retreating path V2 of the right-hand forward corner portion 43 on the screen 19 when the vehicle width guide line is similarly parallel to the road side line.

Further, the driver can sensitively grasp the used eye marks and can easily drive the vehicle if the eye mark 23 and the steering amount guide mark 41 for the left-hand backward parking are set to the same color at the left-hand backward parking time according to the steering wheel operation, and if the eye mark 22 for the right-hand backward parking and the steering amount guide mark for the right-hand backward parking are set to the same color at the right-hand backward parking time. For example, the color of the steering amount guide mark 41 is set to A, and both the colors of the eye marks 22 and 23 at a straight advancing time are set to B. When the steering wheel 7 is turned leftward for the left-hand backward parking at an angle equal to or greater than a predetermined angle, the steering assist device can be constructed such that only the color of the eye mark 23 for the left-hand backward parking is set to A. In contrast to this, when the steering wheel 7 is turned rightward for the right-hand backward parking at an angle equal to or greater than a predetermined angle, the steering assist device can be constructed such that only the color of the eye mark 22 for the right-hand backward parking is next set to A.

Further, the steering assist device may be constructed such that the eye marks 22 and 23 may not be displayed at the straight advancing time, and may be displayed when the steering wheel 7 is turned leftward or rightward at an angle equal to or greater than the predetermined angle. Further, only one of the eye marks used to park the vehicle may be also displayed in accordance with a steering direction of the steering wheel 7. Further, it is preferable to set the colors of the above locus line 40 and the steering amount guide mark 41 to be different from the colors of the vehicle width guide lines 20, 21, the eye marks 22, 23, the steering start guide lines 24, 25 and the moving guide display 26.

In the above embodiment, a deep corner of the parking space T is used as the target point S1, but no target point is not limited to this deep corner. It is sufficient if the target point S1 is fixed to the parking space T.

[Embodiment 2]

Figure 7:
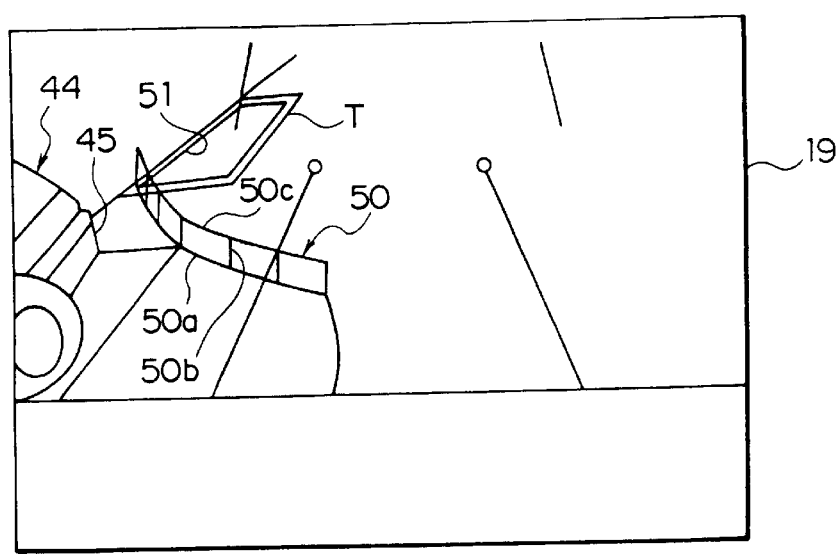
FIG. 7 is a view briefly showing the monitor screen displaying a three-dimensional locus line in Embodiment 2.

FIG. 7 shows the monitor screen displaying a locus line and a steering amount guide mark in a left-hand forward corner portion of the self-vehicle in a steering assist device in accordance with Embodiment 2 of the present invention. The locus line 50 in this embodiment is changed such that height of the locus line 40 in the above Embodiment 1 is displayed. Accordingly, the locus line 50 comprises a ground display portion 50a corresponding to the locus line 40, plural vertical portions 50b extending upward from the ground display portion 50a, and a height display portion 50c passing an upper end of each vertical portion. The respective vertical portions 50b are calculated and displayed by setting positions of reality expressed by the vertical portions 50b are separated from positions of reality expressed by the adjacent other vertical portions at an equal interval. Further, the respective vertical portions 50b are calculated and displayed such that all the vertical portions 50b have about 50 cm in height from the ground as a bumper height of the self-vehicle, i.e., the bumper height of a passenger car. A predicting parking area shown by the steering amount guide mark 51 is similar to the parking predicting locus shown by the above steering amount guide mark 41. A driver can make a judgment from a three-dimensional view by seeing the display of the above locus line 50 as to whether or not the left-hand forward corner portion of the self-vehicle interferes with a certain obstacle in a path between the vehicle and a target parking space. For example, the driver can make a more accurate judgment about the interference with a high portion separated from the ground such as a bumper 45 of another vehicle, etc.

The steering assist device in Embodiment 2 is similar to that in the above Embodiment 1 including display timing of the locus line, etc. except for the locus line 50. With respect to the screen display of FIG. 7, clearness of this figure is preferentially set and the moving guide display 26, etc. are omitted in this figure.

[Embodiment 3]

Figure 8:
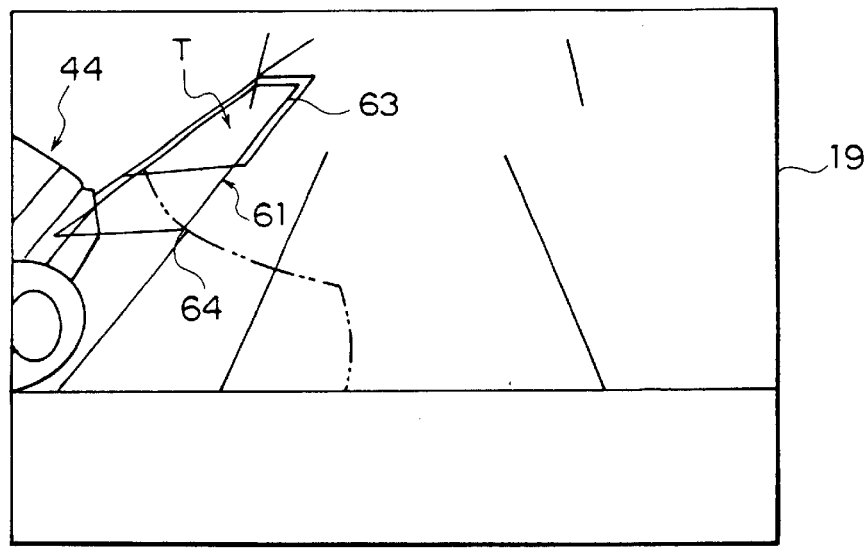
FIG. 8 is a view briefly showing the monitor screen displaying a steering amount guide mark as a parking necessary area in Embodiment 3.
Figure 9:
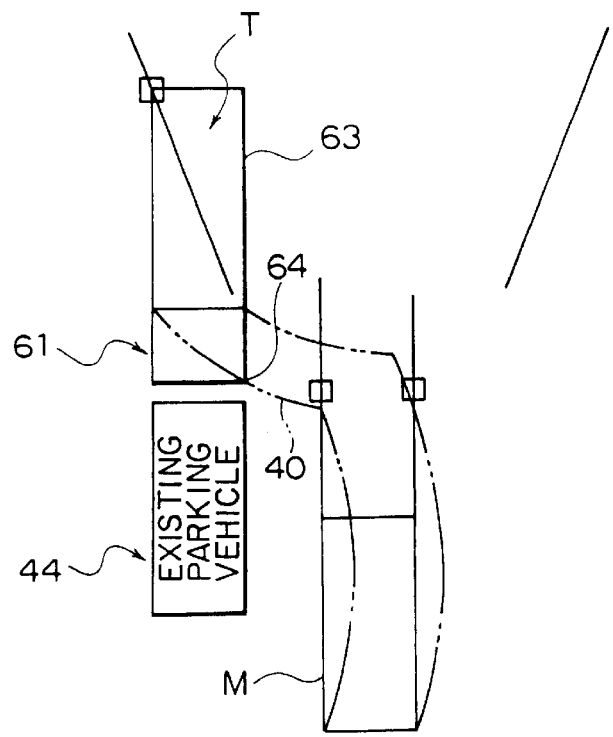
FIG. 9 is a view showing a set mode of the steering amount guide mark in Embodiment 3.

FIG. 8 shows the monitor screen displaying a steering amount guide mark in a steering assist device in accordance with Embodiment 3 of the present invention. In this embodiment, a steering amount guide mark 61 showing a parking necessary area is displayed instead of the displays of the steering amount guide mark 41 and the locus line 40 in Embodiment 1. A set mode of the steering amount guide mark 61 will be explained on the basis of FIG. 9. First, when the self-vehicle is located in a position M, a locus corresponding to the locus line 40 is set in a mode similar to the above Embodiment 1. For convenience of the explanation, such a locus is shown by a two-dotted chain line in FIG. 9, but is not displayed on the actual monitor screen 19. An intersection point 64 of such a locus line and a side line 63 on the central side of a road on a side reverse to a road shoulder of the predicting parking area in Embodiment 1 is set. The steering amount guide mark 61 is set as a mark showing a first parking necessary area of a square shape including the predicting parking area and such an intersection point 64 as a vertex of an outer shape. Similar to display timing of the locus line in the above Embodiment 1, the steering amount guide mark 61 is displayed on the monitor screen 19. It is not necessary to separately display the locus line of an end portion of the vehicle by using the steering amount guide mark as such a parking necessary area display so that the monitor screen display can be clearly seen.

[Embodiment 4]

Figure 10:
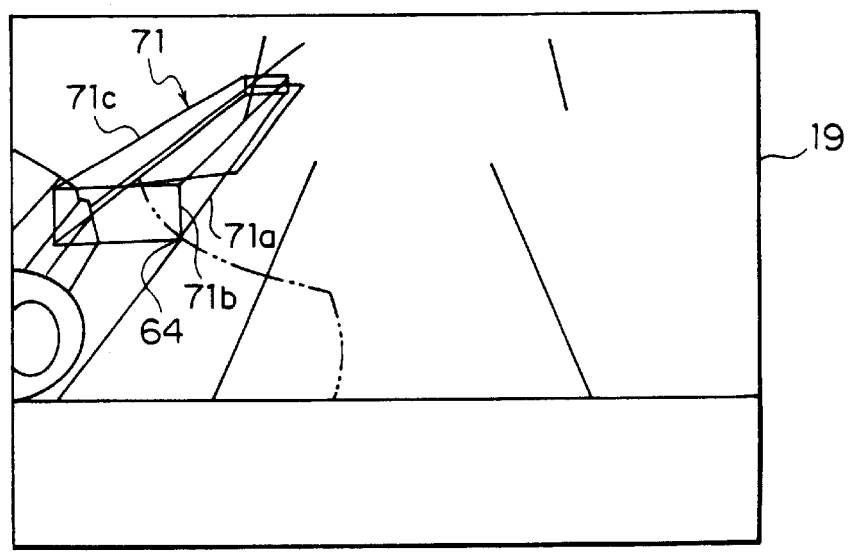
FIG. 10 is a view briefly showing the monitor screen displaying a steering amount guide mark as a three-dimensional parking necessary area in Embodiment 4.

FIG. 10 shows the monitor screen displaying a steering amount guide mark in a steering assist device in accordance with Embodiment 4. The steering amount guide mark 71 in this embodiment is changed such that height of the parking necessary area 61 in the above Embodiment 3 is displayed. Accordingly, the steering amount guide mark 71 includes a ground display portion 71a corresponding to the steering amount guide mark 61 as the parking necessary area, plural vertical portions 71b extending upward from each vertex of the ground display portion 71a, and a height display portion 71c with an upper end of each vertical portion as a vertex. The respective vertical portions 71b are calculated and displayed such that all the vertical portions 71b have about 50 cm in height from the ground.

In this embodiment in which such a steering amount guide mark 71 is displayed, it is also possible to prevent that a driver notices that no vehicle can be parked after the vehicle is retreated to a certain extent, and the driver must again park the vehicle. Further, if the three-dimensional steering amount guide mark 71 approximate to the locus of an outer shape of the vehicle at a parking time is displayed in this way, the driver can escape from interference of the locus toward an obstacle by adjusting a steering wheel operation even when it seems probable that no vehicle can be continuously retreated by confirming the entire locus. Accordingly, the driver can also make a judgment by confirming the relation of the outer shape of the vehicle at a parking completion time and a target parking space as to whether the vehicle can be continuously retreated or not.

[Embodiment 5]

Figure 11:
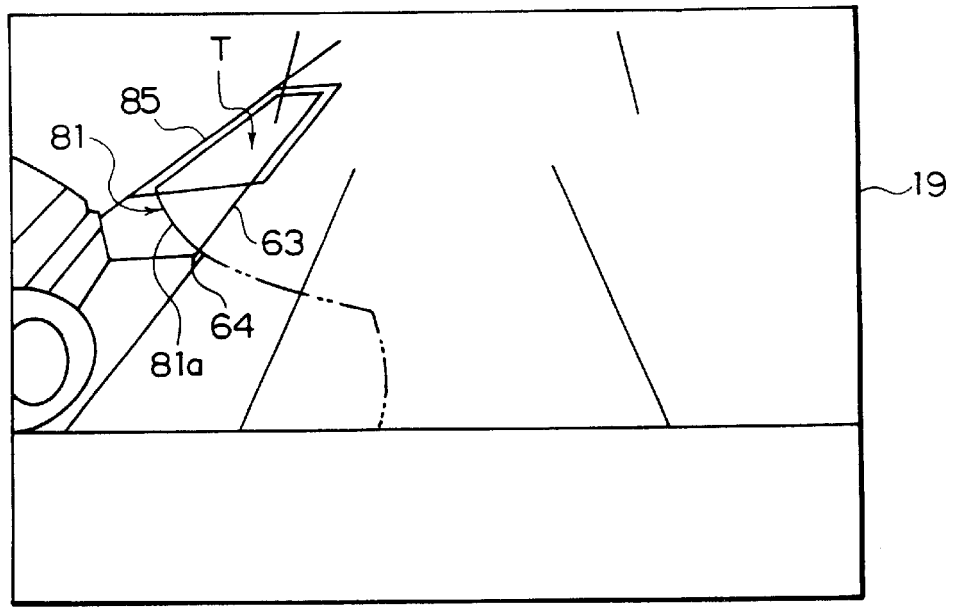
FIG. 11 is a view briefly showing the monitor screen displaying a steering amount guide mark as a parking necessary area in Embodiment 5.

FIG. 11 shows the monitor screen displaying a steering amount guide mark in a steering assist device in accordance with Embodiment 5. The steering amount guide mark 81 in this embodiment is set as follows. First, a locus corresponding to the locus line 40 is set in a mode similar to the above Embodiment 1. An intersection point 64 of such a locus line and a side line 63 on the central side of a road on a side reverse to a road shoulder of the predicting parking area in Embodiment 1 is set. A steering amount guide mark 81 is set as a second parking necessary area including the predicting parking area, such an intersection point 64 as a vertex of the outer shape of an area, and a portion 81a of the locus line from the vertex 64 to a side line 85 on a road shoulder side of the predicting parking area in Embodiment 1 in the outer shape of the area. If the steering amount guide mark 81 using the locus line at a front end of the vehicle in the outer shape is used in this way, it is easy to more sensitively judge whether or not the self-vehicle interferes with a certain obstacle in a path between the self-vehicle and a target parking space in comparison with the parking necessary area of a square shape as mentioned above.

[Embodiment 6]

Figure 12:
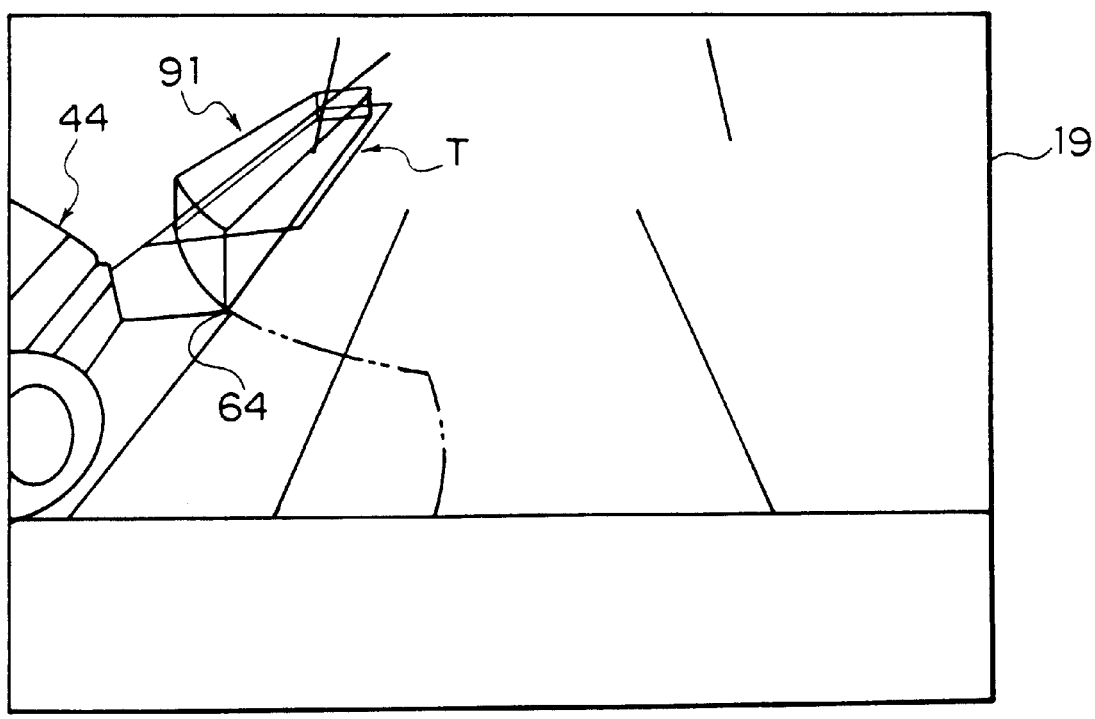
FIG. 12 is a view briefly showing the monitor screen displaying a steering amount guide mark as a parking necessary area in Embodiment 6.

FIG. 12 shows the monitor screen displaying a steering amount guide mark in a steering assist device in accordance with Embodiment 6. The steering amount guide mark 91 in this embodiment is changed such that height of the steering amount guide mark 81 in the above Embodiment 5 is displayed. The steering amount guide mark 81 is calculated and displayed such that this guide mark has about 50 cm in height from the ground.

[Other Embodiments]

The above explanation has been made on the basis of the plural embodiment modes, but the steering assist device of the present invention is not limited to such embodiment modes, but can be further modified and embodied as follows.

First, as mentioned above, the steering amount guide mark and the locus line are set to be automatically erased from the monitor screen when a predetermined time has passed after they have been displayed on the monitor screen. However, the present invention is not limited to such a mode. For example, a means such as a yaw rate sensor, etc. able to detect a yaw angle of the vehicle may be arranged. In this case, after a column parking mode is started and the steering amount guide mark is displayed, the display of the steering amount guide mark, etc. may be terminated when it is detected that the yaw angle of the vehicle from that in the vehicle position M is changed to a predetermined angle.

The eye mark need not be formed in a circular shape. For example, a figure approximately having the same shape as a target parking space to be displayed on the monitor screen 19 is calculated in advance when the vehicle reaches a position P, i.e., a turning-back position of the steering wheel as shown in FIG. 3D, such a figure may be also adopted as the shape of the eye mark. In such a mode, the eye mark and the target parking space are exactly overlapped with each other on the monitor screen in the turning-back position of the steering wheel. Therefore, a driver can more easily know a turning-back time point of the steering wheel.

Further, a mode for guiding the turning-back position of the steering wheel to the driver by a voice without displaying the eye mark itself may be also used. Namely, a change in the yaw angle of the vehicle from the vehicle position M to the steering wheel turning-back position P is calculated in advance. The steering assist device can be constructed such that, when the vehicle reaches the steering wheel turning-back position, a voice for guiding this arrival is outputted from the change in the yaw angle of the vehicle detected by the yaw rate sensor, etc. during the actual parking operation.

In the above embodiment, the column parking on the left-hand side of a road is set as an example, and only the locus line 40 of the left-hand forward corner portion is displayed on the monitor screen on the basis of the retreating path V1 of the left-hand forward corner portion 42. However, the locus line of a right-hand forward corner portion 43 may be also calculated on the basis of a retreating path V2 of the right-hand forward corner portion 43, and both the two locus lines of the left-hand forward corner portion and the right-hand forward corner portion may be also simultaneously displayed to provide more detailed information of obstacle interference. In the column parking case on the left-hand side of the road, the locus line of the right-hand forward corner portion 43 is displayed on the basis of the retreating path V2 of the right-hand forward corner portion 43. However, in this case, both the two locus lines of the left-hand forward corner portion and the right-hand forward corner portion may be also simultaneously displayed.

Further, in all the above explanations, the retreating path V constructed by a first arc path B1 with the turning radius Rc, a path located in the steering wheel turning-back position P and a second arc path B2 with the turning radius R as shown in FIG. 5 is utilized as the retreating path until the target parking space T. Namely, an example of the column parking case is explained. However, the steering assist device of the present invention is not limited to this example, but can be also applied to parallel parking. Namely, in the parallel parking case, a position turned by 90 degrees from a parking start position while retreating the vehicle on a single arc path can be set to a parking completion position. The locus line of a forward corner portion of the vehicle and the steering amount guide mark as a predicting parking area can be displayed on the basis of such a single arc path.

As explained above, in accordance with the steering assist device of the present invention, a backward picture image of the vehicle photographed by a camera and a guide display at a parking time are superposed and displayed on the screen of a monitor at a retreating time of the vehicle. Accordingly, a driver can easily grasp a steering start spot for parking, a steering amount and a turning-back spot of the steering wheel on the basis of a steering start guide line, an eye mark and a steering amount guide mark included in the guide display, and the backward picture image of the vehicle. Further, the steering amount guide mark is set such that the steering amount guide mark is approximately overlapped with the target parking space at the time of a suitable steering amount. Therefore, the driver can instinctively recognize that the vehicle is successively parked at the steering angle of the steering wheel at that time. Accordingly, the guide display is easily understood.

Further, in accordance with a mode in which the above guide display includes the locus line of a specific portion of the vehicle at the retreating time of the vehicle, the driver can easily judge by the locus line whether the vehicle can be parked or not without any interference of the self-vehicle with an obstacle near the target parking space at the initial stage of a parking operation. Accordingly, it is possible to prevent the driver noticing that the vehicle can not be parked after the vehicle has retreated to a certain extent, and the driver must again park the vehicle.

In accordance with a mode of the above steering amount guide mark showing a first parking necessary area of a square shape in which an intersection point of the locus line of the specific portion of the vehicle at the retreating time of the vehicle, and a side line on the central side of a road in the above predicting parking area is set to a vertex, it can be easily judged by observing the positional relationship of the steering amount guide mark as a parking necessary area and the obstacle in the backward picture image of the vehicle whether or not the self-vehicle can be parked without any interference with the obstacle. Further, since it is not necessary to separately display only the locus line, the monitor screen can be seen clearly and easily.

In accordance with a mode of the above steering amount guide mark showing a second parking necessary area in which an outer shape of this second parking necessary area includes a portion of the above locus line extending from the intersection point of the locus line of the specific portion of the vehicle at the retreating time of the vehicle, and the side line on the central side of the road in the above predicting parking area to the side line on a road shoulder side of the above predicting parking area, it can be easily judged by observing the positional relationship of the steering amount guide mark as a parking necessary area and the obstacle in the backward picture image of the vehicle whether or not the self-vehicle can be parked without any interference with the obstacle. Further, a more instinctive judgment can be easily made since the locus line is included in one portion of the outer shape of the steering amount guide mark as a parking necessary area.

In accordance with a mode in which the above steering amount guide mark or the locus line has a height, the steering amount guide mark or the locus line is a three-dimensional display able to show the height. Therefore, the driver can judge from a three-dimensional viewpoint whether the self-vehicle interferes with the obstacle or not. For example, a more exact judgment can be also made in interference with a high portion separated from the ground such as a bumper of another vehicle, etc.

In accordance with a mode in which the above steering amount guide mark is displayed in the monitor by turning the steering wheel in a predetermined vehicle position and is automatically erased from the monitor after a predetermined time has passed after this display, the steering amount guide mark can be automatically displayed in the monitor without performing any operation of the driver in each case. Further, in an unnecessary case of the steering amount guide mark at the retreating time, the steering amount guide mark can be automatically erased from the monitor without performing any operation in each case. Accordingly, it is convenient for the driver, and it is possible to prevent the steering amount guide mark overlapping with another information so it is not easily seen.

What is claimed is:

1. A steering assist device comprising:
    a camera for photographing a backward portion of a vehicle;
    a monitor arranged in a driver's seat of the vehicle;
    a steering angle sensor for detecting the steering angle of a steering wheel; and
    display control means for displaying a picture image provided by said camera on said monitor at a retreating time of the vehicle, and superposing and displaying a guide display for supporting driving of the vehicle at a parking time on a screen of said monitor,
    the steering assist device being characterized in that said guide display including:
        a steering start guide line fixedly displayed in a predetermined position on the screen of said monitor for guiding a steering start spot for parking;
        an eye mark fixedly displayed in a predetermined position on the screen of said monitor for guiding a turning-back spot of the steering wheel; and
        a steering amount guide mark moved and displayed along said steering start guide line on the screen of said monitor in accordance with the steering angle of the steering wheel detected by said steering angle sensor,
    said steering amount guide mark including a predicting parking area when the vehicle retreats and parking is completed with maintaining the steering angle of the steering wheel detected by said steering angle sensor,
    said steering amount guide mark being changed in size on the basis of far and near sense according to the steering angle.

2. A steering assist device according to claim 1, wherein said guide display further includes a locus line of a specific portion of the vehicle at a retreating time of the vehicle.

3. A steering assist device according to claim 2, wherein said steering amount guide mark or the locus line expresses a height.

4. A steering assist device according to claim 2, wherein said specific portion of the vehicle is a left-hand forward corner portion of the vehicle in case of a column parking on the left-hand side of a road, and is a right-hand forward corner portion of the self-vehicle in case of the column parking on the right-hand side of the road.

5. A steering assist device according to claim 1, wherein said steering amount guide mark shows a first parking necessary area of a square shape in which an intersection point of a locus line of a specific portion of the vehicle at a retreating time of the vehicle and a side line on a road central side of said predicting parking area is a vertex.

6. A steering assist device according to claim 1, wherein said steering amount guide mark shows a second parking necessary area in which an outer shape of the second parking necessary area includes a portion of a locus line extending from an intersection point of the locus line of a specific portion of the vehicle at a retreating time of the vehicle and a side line on a road central side of said predicting parking area to the side line on a road shoulder side of said predicting parking area.

7. A steering assist device according to claim 1, wherein said steering amount guide mark is displayed on the monitor by turning the steering wheel in a predetermined vehicle position, and is automatically erased from the monitor after a predetermined time has passed after the display.

* * * * *

UNITED STATES PATENT AND TRADEMARK OFFICE
CERTIFICATE OF CORRECTION

PATENT NO. : 6,825,880 B2
DATED : November 30, 2004
INVENTOR(S) : Goro Asahi et al.

It is certified that error appears in the above-identified patent and that said Letters Patent is hereby corrected as shown below:

Title page,
Item [56], References Cited, FOREIGN PATENT DOCUMENTS, please delete
"JP    2-126417    8/1990 ...... B60R/1/00" and insert therefore
-- JP   2-36417    8/1990 ...... B60R/1/00 --

Signed and Sealed this

Eighth Day of March, 2005

JON W. DUDAS
*Director of the United States Patent and Trademark Office*